United States Patent [19]
Reber

[11] 3,916,725
[45] Nov. 4, 1975

[54] GEAR BOX CARRYING ROTARY SCYTHE MOWER ROTORS DRIVEN FROM UNDERNEATH

[75] Inventor: Walter Reber, Saverne, France

[73] Assignee: Kuhn S.A., Saverne, France

[22] Filed: Apr. 11, 1974

[21] Appl. No.: 460,131

[30] Foreign Application Priority Data
May 7, 1973   France .............................. 73.17015

[52] U.S. Cl. ........................ 74/606 R; 56/6; 56/295
[51] Int. Cl.² ......................................... F16H 57/02
[58] Field of Search ................. 56/6, 295; 403/370; 74/606

[56] References Cited
UNITED STATES PATENTS

| | | | |
|---|---|---|---|
| 14,898 | 5/1856 | Barrett | 56/295 |
| 119,640 | 10/1871 | Polson | 56/295 |
| 664,386 | 12/1900 | Davidson | 74/606 R |
| 1,116,095 | 11/1914 | Mellis | 403/370 X |
| 1,392,276 | 9/1921 | Kirkham | 74/606 R X |
| 3,698,265 | 10/1972 | Williams | 74/606 R |

*Primary Examiner*—Hugh R. Chamblee
*Assistant Examiner*—Daniel J. Leach
*Attorney, Agent, or Firm*—Young & Thompson

[57] ABSTRACT

The disclosure is of a gear box carrying rotary scythe mower rotors, especially comprising an upper half box and a lower half box which are placed beneath the rotors, in which box there is lodged a train of pinions effecting the drive of the said rotors, characterised in that intermediate pinions placed between two adjacent rotors are articulated in rotation upon sockets fixed to or part of the upper half box and in that sockets fixed to or part of the lower half box partially fit into the upper sockets, a packing being gripped between the said sockets by a tightening screw.

4 Claims, 3 Drawing Figures

GEAR BOX CARRYING ROTARY SCYTHE MOWER ROTORS DRIVEN FROM UNDERNEATH

INTRODUCTION AND BACKGROUND OF THE INVENTION

The present invention relates in general to rotary scythe mowers provided with rotors carrying cutting elements which during work are held outwards under the action of centrifugal force, where the rotors are driven by a train of pinions lodged in a rotor-carrier box which is assembled and placed beneath the said rotors. This invention relates in particular to the rotor-carrier box composed especially of an upper half box and a lower half box which are assembled. In such a box the fixing of the drive pinions of the rotors and of the intermediate pinions upon the upper half box facilitates assembly and permits of having quite wide manufacturing tolerances on both box halves. However, in this form of embodiment the gear box, subjected to many forces during work, has a strong tendency to deformation.

BRIEF SUMMARY OF THE INVENTION

According to this invention the intermediate pinions placed between two rotors are articulated in rotation on sockets fixed to or parts of the upper half box. Sockets fixed to or part of the lower half box fit partially into the sockets fixed to or parts of the upper half box. A packing is gripped between the said sockets by a tightening screw, and a certain lateral play exists between these sockets, after tightening, in the zone where these sockets fit into one another.

FURTHER DESCRIPTION AND ADVANTAGE OF THE INVENTION

These characteristics have the advantages of facilitating assembly since assembling of the drive elements takes place only on the upper box half, of reducing the manufacturing and interchangeability costs since the manufacture of the gear box is relatively simple and since it is not necessary to match the two box halves precisely in view of the lateral play existing between the sockets, and of ensuring stiffening in the central zone of the gear box without necessitating the use of a stoutly dimensioned and thus burdensome gear box requiring a great minimum cutting height.

Further features of the invention will appear from the following description with reference to the accompanying drawings which represent by way of non-limitative example a form of embodiment in accordance with the invention.

BRIEF DESCRIPTION OF THE VIEWS IN THE DRAWINGS

In the drawings:

FIG. 1 represents a diagrammatic plan view of a gear box carrying rotary scythe mower rotors, enclosing a train of pinions effecting the drive of the rotors, FIG. 2 represents an enlarged longitudinal section in the plane A—A in FIG. 1 of a portion of the gear box carrying two rotor drive pinions and a pair of intermediate pinions, FIG. 3 represents, on a larger scale, an example of the device for fixing an intermediate pinion and for stiffening the gear box.

DETAILED DESCRIPTION OF THE PREFERRED EMBODIMENTS

Figure 1:
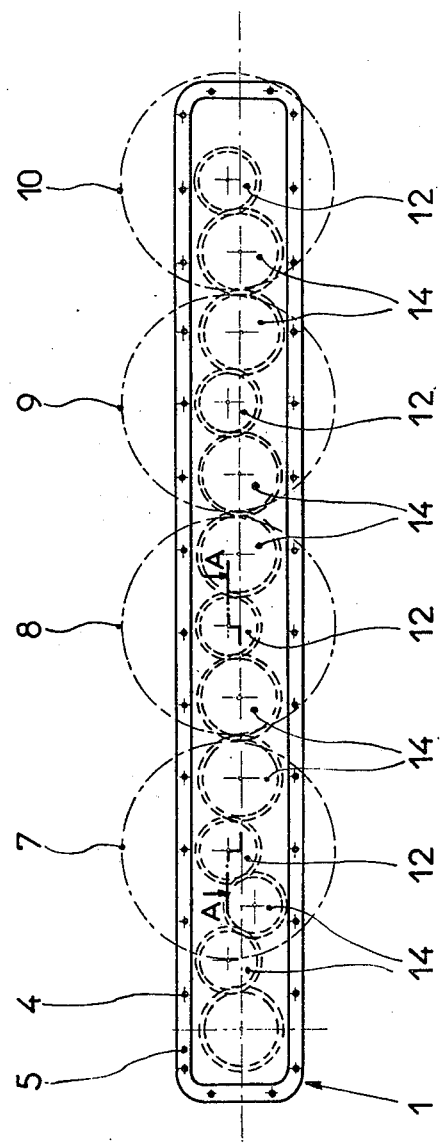
Figure 2:
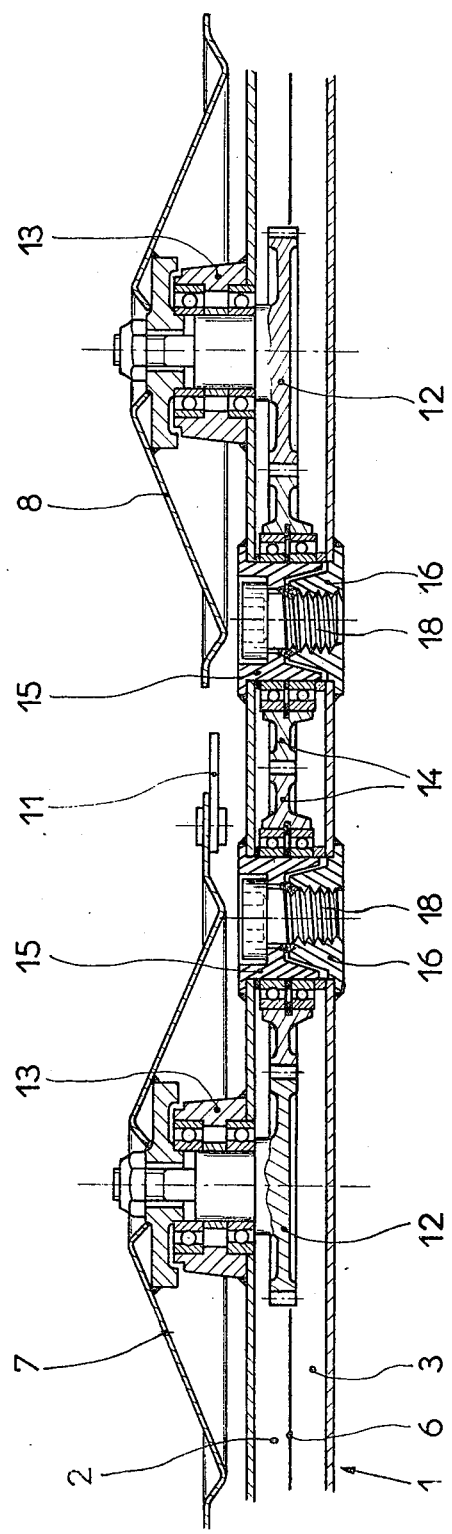

Referring to FIGS. 1 and 2 of the drawings it is seen that the rotor-carrier box 1 is constituted by two similar box halves, an upper box half 2 and a lower box half 3, assembled by bolts 4 which unite their edges 5, between which a gasket 6 is placed. The rotors 7, 8, 9 and 10 supporting the cutting elements 11 are driven in rotation by shafted pinions 12 articulated in bearings 13 made fast with the upper box half 2. These shafted pinions mesh with intermediate pinions 14 which effect the transmission between the said shafted pinions.

According to the invention the intermediate pinions 14 are articulated on sockets 15 fixed to or parts of the upper box half 2. Sockets 16 fixed to or parts of the lower box half 3 fit partially into the sockets 15 fixed to or parts of the upper box half 2. The sockets 16 possess a tapping 17 and serve as nuts for the tightening screws 18. A certain lateral play 19 exists after tightening, in the zone where the sockets 15 and 16 fit into one another. A packing 20 gripped between the sockets 15 and 16 especially ensures sealing of the gear box 1.

In the non-limitative case in accordance with the invention a spacing and stop ring 21 is mounted with slight gripping on the socket 15 of the upper box half 2. This feature facilitates assembling of the two box halves because it maintains pinions 14 on sockets 15 until the two box halves are tightened together.

Figure 3:
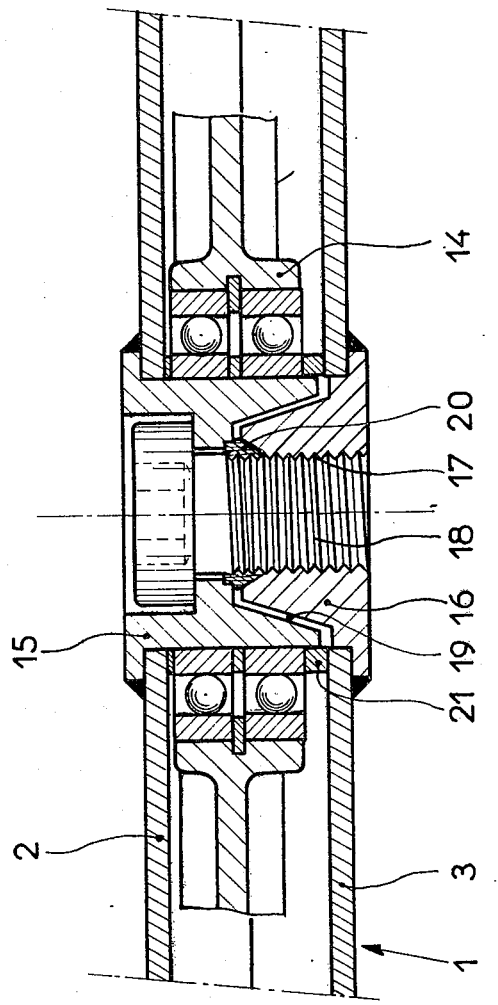

According to FIG. 3 the tightening screw 18 has good engagement in the tapping 17 provided in the socket 16, permitting of ensuring correct tightening of the two box halves 2 and 3. However the overall length of this tightening screw 18 is not greater than the thickness of the rotor carrier box 1 in the zone of the sockets 15 and 16.

The two box halves 2 and 3 can be made simply of pressed sheet metal, and the sockets 15 and 16 can be made fast with them by welding.

This feature has the advantage of being relatively trouble-free both in design and in replacement.

What is claimed is:

1. A gear box carrying rotary scythe mower rotors, comprising an upper half box and a lower half box disposed beneath the rotors, a train of pinions in the box for effecting the drive of said rotors, certain of said pinions being intermediate the rotors, upper sockets secured to the upper half box, said intermediate pinions being mounted for rotation on said upper sockets, lower sockets secured to said lower half box, said lower sockets fitting partially into said upper sockets, tightening screws having heads that bear on said upper sockets, said screws extending through said upper sockets and being screw threadedly engaged only with said lower sockets, and packing between said upper and lower sockets.

2. A gear box as claimed in claim 1, there being lateral play between said upper and lower sockets.

3. A gear box as claimed in claim 1, said screws extending no lower than said lower sockets.

4. A gear box as claimed in claim 1, said lower half box being made of pressed sheet metal and said lower sockets being secured to said lower half box by welding.

* * * * *